United States Patent [19]

Durland

[11] Patent Number: 4,803,371

[45] Date of Patent: Feb. 7, 1989

[54] OPTICAL SCANNING METHOD AND APPARATUS USEFUL FOR DETERMINING THE CONFIGURATION OF AN OBJECT

[75] Inventor: Sven O. Durland, Lake Oswego, Oreg.

[73] Assignee: The Coe Manufacturing Company, Painesville, Ohio

[21] Appl. No.: 103,029

[22] Filed: Sep. 30, 1987

[51] Int. Cl.$^4$ .................... G01B 11/02; G01B 11/04
[52] U.S. Cl. .................... 250/560; 356/381; 356/383
[58] Field of Search .................... 250/560–561, 250/571–572; 356/375, 376, 379, 381, 383–387, 1; 364/559–564; 358/107

[56] References Cited

U.S. PATENT DOCUMENTS

| | | | |
|---|---|---|---|
| 3,187,185 | 6/1965 | Milnes | 356/381 |
| 4,298,286 | 11/1981 | Maxey et al. | 356/381 |
| 4,301,373 | 11/1981 | Sjodin | 250/561 |

Primary Examiner—Edward P. Westin
Attorney, Agent, or Firm—Klarquist, Sparkman, Campbell, Leigh & Whinston

[57] ABSTRACT

An optical scanning system illuminates the object to be scanned with non-coherent light and laser light simultaneously. A photodetector camera views the object and produces a single output signal indicative of the magnitude of non-coherent light and laser light reflected from the object. These two components of the output signal are then distinguished and used to determine both the length of the object and its thickness relative to a reference location. The accuracy of the length measurement can be refined by correcting for parallax error introduced by the thickness of the object. If the object is moved and successive samples taken, the configuration of the object in three dimensions can be determined.

25 Claims, 6 Drawing Sheets

OPTICAL SCANNING METHOD AND APPARATUS USEFUL FOR DETERMINING THE CONFIGURATION OF AN OBJECT

FIELD OF THE INVENTION

The present invention relates generally to optical scanning systems and more particularly to a method and apparatus useful for determining the configuration of an object in two or three dimensions using a linear photodetector.

BACKGROUND OF THE INVENTION

Automated manufacturing equipment relies increasingly on non-contact electronic scanners, such as sonar scanners or optical scanners, to determine the location and dimension of articles being processed by the equipment. The outputs from these scanners are typically fed to computer control systems which dictate the further processing of the articles based on their dimensions or positions.

A number of optical scanning systems have been used in the prior art with varying degrees of success. One popular system is known as shadow scanning and involves a linear array of dozens of light sources opposite a corresponding linear array of photodetectors. The object being scanned is positioned between the sources and photodetectors, causing various of the light beams to be interrupted. A computer monitoring the photodetectors notes which of the light beams are interrupted, thus indicating one dimension of the object. By advancing the object through the "light curtain" at a uniform rate and sampling the photodetector outputs at periodic intervals, additional data can be obtained about the configuration of the object in a second dimension.

Shadow scanners suffer from a number of drawbacks. One is that a scanner with dozens of discrete light sources and dozens of discrete photodetectors arranged over what may often be a ten or twenty foot area is inherently costly, complex and unreliable. If any of this multitude of components fail, operation of the system is impaired. Another drawback is that the shadow scanner provides no information about the configuration of the object in a dimension parallel to the light path.

In some applications a light reflection optical scanner such as a laser ranging system using triangulation techniques can advantageously be employed to characterize an object's configuration. In such a system a laser beam is projected obliquely against the object and a photoelectric camera is positioned to include in its field of view the point at which the laser intersects the object. If the object is relatively larger, the location at which the laser light intersects the object will appear to shift towards the side from which the laser light is emanating. Conversely, if the object is relatively smaller, the point of intersection will appear to shift in the opposite direction. By detecting in the camera output signal the position of the laser light on the object, the object's dimension relative to a reference location can be determined.

Laser ranging systems, too, suffer rom a number of drawbacks. Principal among these is the limited information they provide. In the foregoing example, the system provides information solely on the distance between the surface of the object and a reference location. Again, by moving the object relative to the laser scanner, cross-sections at different portions of the object can be obtained so as to determine a second dimension of the object. However, laser systems are unable to provide any information about the configuration of the object in the third dimension.

To characterize the shape of an object in three dimensions, an optical scanner system that includes two orthagonally positioned shadow scanners is sometimes employed. The object to be measured is first passed horizontally through a shadow scanner comprised of vertically spaced light sources and photodetectors. The object is next passed vertically through a second scanner comprised of horizontally spaced light sources and photodetectors. The data from these two scanners is then processed to roughly characterize the shape of two orthogonal sections through the length of the log. However, even with this elaborate system, the data provided is poor, as no information is obtained about object configuration between the orthogonally related sections.

Another type of optical scanning system for determining the shape of an object in three dimensions is shown in U.S. Pat. No. 4,301,373 and employs both laser ranging and light reflectance techniques. In this system, the object being scanned is illuminated in phases, first by a first neon strobe oriented obliquely towards the object, next by a second neon strobe oriented orthogonally to the first, and then by a laser beam. A camera records the reflectance of the object to each of these illuminations in separate scan data output signals which are then provided to a computer for processing. Since the reflectance of the object is a function of the illumination's angle of incidence, the computer can determine by a comparison of the two neon strobe data the inclination of the object's surface. The laser beam data provides information on the object's thickness.

While the foregoing system is useful in certain applications, its complexity and its inability to resolve certain surface inclinations renders it poorly suited for many applications.

Therefore, a need remains for a method and apparatus for characterizing the configuration of objects simply and reliably in two or three dimensions.

SUMMARY OF THE INVENTION

Accordingly, it is a principal object of the present invention to provide a method and apparatus for simply and reliably characterizing the configuration of an object in two or three dimensions using optical scanning.

It is a further object of the present invention to combine the dimensional accuracy afforded by laser ranging systems with the advantages of shadow scanning systems without employing all the hardware used for these systems when implemented individually.

It is still another object of the present invention to provide from a linear photodetector a single electrical data signal that contains information about two dimensions of a stationary object.

It is yet a further object of the present invention to refine the measurement of one dimension of an object by compensating for measurement errors introduced by a second dimension of the object.

It is still another object of the present invention to provide a mathematical processing technique which is equally applicable to laser ranging systems and shadow scanning systems for determining the configuration of an object.

According to one form of the present invention, the object to be scanned is illuminated with both non-coherent light and laser light simultaneously. A camera views the illuminated object and produces a single output signal indicative of the magnitude of non-coherent light and laser light reflected therefrom. These two components of the output signal are then distinguished and used to determine both the length of the object and its thickness relative to a reference location. The accuracy of the length measurement can be refined by subtracting out parallax error introduced by the thickness of the object. If the object is moved and successive samples taken, the configuration of the object in three dimensions can be determined.

These and other objects, features and advantages of the present invention will be more readily apparent from the following detailed description of a preferred embodiment thereof, which proceeds with reference to the accompanying drawings.

DETAILED DESCRIPTION OF PREFERRED EMBODIMENT

Scanner Apparatus

For expository convenience, the following detailed description proceeds with reference to a single illustrative application—that of characterizing the configuration of an unfinished piece of lumber in a lumber processing system. However, it should be recognized that the invention is not thereby limited but finds application in characterizing the configuration of virtually any object.

A representative lumber piece whose configuration may be characterized with the present invention is an unfinished board having one surface sawn to flatness and having at least one wane surface oblique to the sawed surface which is to be trimmed away in a subsequent operation. The invention's characterization of the board's configuration is used to calculate trimming cuts that will convert the board into a finished piece of lumber having the highest obtainable economic value, taking into account both market conditions and the configuration of the unfinished workpiece itself. The optimizing calculations are performed by known data processing equipment programmed in a known manner, but the accuracy of the results obtaned with such equipment is necessarily dependent upon the sufficiency and the accuracy of the data fed into it.

Figure 1:
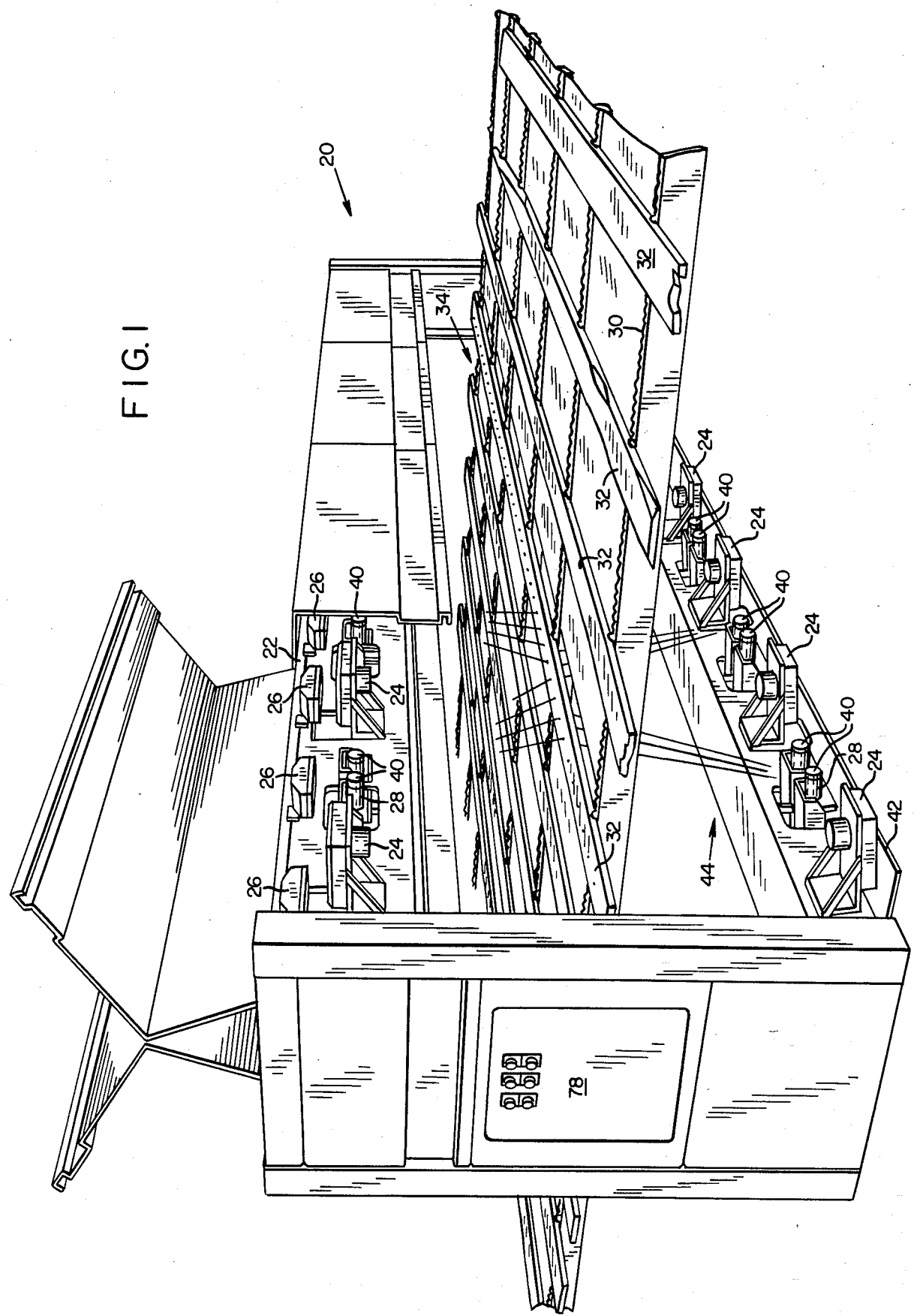
FIG. 1 is a perspective view of a scanning system according to the present invention.
Figure 2:
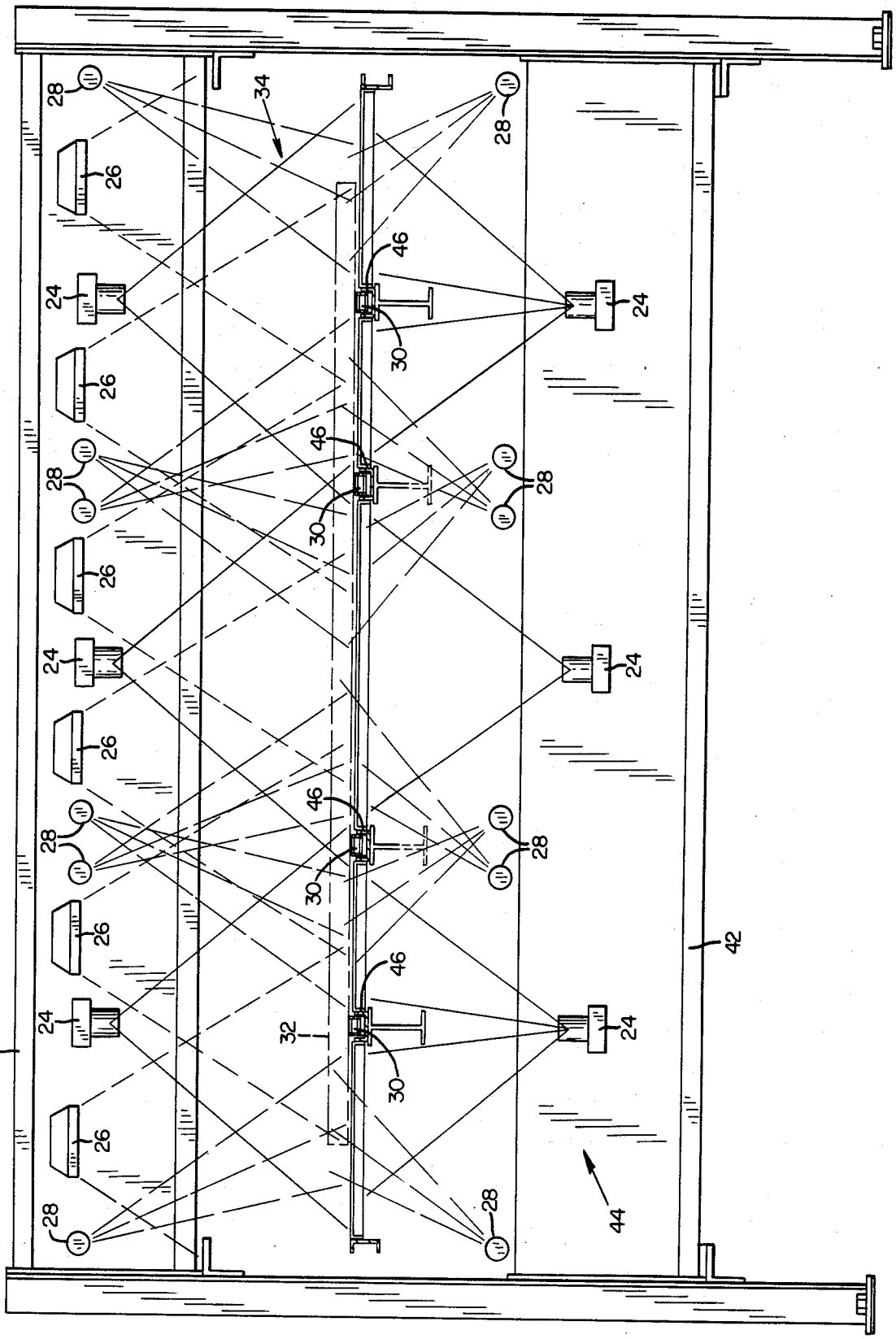
FIG. 2 is a frontal view of the system of FIG. 1 illustrating the relationship between the laser light sources, the incandescent light sources, the cameras and the object being scanned.
Figure 3:
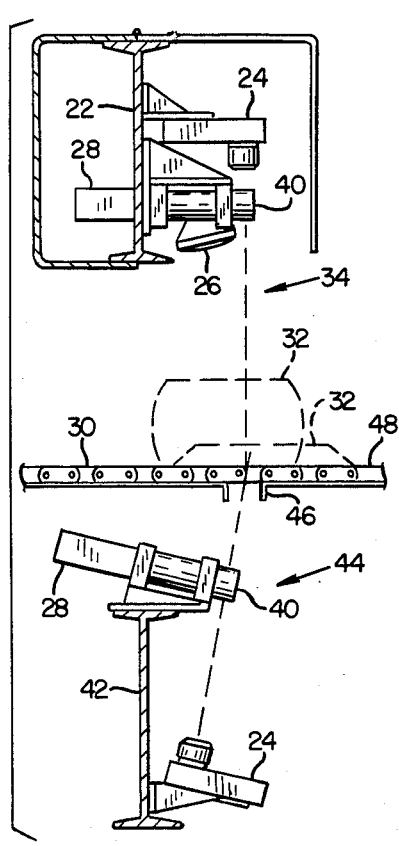
FIG. 3 is a side view of the system of FIG. 1.

With reference to FIGS. 1-3, an illustrative optical scanning apparatus 20 according to the present invention includes a frame 22 onto which a plurality of cameras 24, incandescent light sources 26 and laser light sources 28 are mounted. A material conveying system 30, such as the chain conveyor shown or a pair of end dogs (not shown), carries the unfinished boards or cants 32 to be measured through a scanning zone 34 under frame 22 at which location the lumber is illuminated by light sources 26, 28. Cameras 24 sense the light reflected from the board and provide this data to subsequent processing stages which determine the configuration of the board therefrom.

Incandescent light sources 26 desirably comprise halogen lamps directed toward scanning zone 34 for illuminating the board, including ends and edges thereof, thereby permitting determination of the board's extent. Laser sources 28 are conventional helium-neon lasers operated in conjunction with beam splitters 40, thereby permitting determination of board thickness using conventional triangulation techniques. Beam splitters 40 split each laser's output beam into several beams at angularly spaced intervals so that a multitude of coherent light beams intersect the lumber being scanned in colinear fashion, as shown in FIGS. 1 and 2. Cameras 24 each comprise a photoelectric target which may be a 1024 element linear photodiode array (CCD) 36 onto which light reflected from a board 32 is focused by a lens 38 (FIG. 4) so that the board's thickness, wane and length can be computed.

In the illustrated system, additional laser sources 28, beam splitters 40 and cameras 24 are positioned on a lower frame 42 and are used to image the underside of the boards. This bottom scanning assembly 44 is employed to detect downwardly facing wane edges and characterize their configuration. By permitting the positioning of lumber both wane up and wane down, system flexibility, and ultimately yield, is enhanced. The bottom scanner also permits the accurate determination of board thickness without holddown devices, even when boards are twisted or bowed. If the boards always lie flat and are positioned with their wanes face up, bottom scanning assembly 44 can be omitted without consequence.

FIG. 3 is a side view showing the orientations of the various system components. The upper cameras 24 and lasers 28 are oriented straight down towards board 32. The lower cameras and lasers, however, are offset from vertical by a small angle so as to prevent occlusion of their optics by debris falling from the lumber. This offset angle also prevents the lower scanning equipment from viewing straight into the upper scanning equipment. Care should be taken, however, not to incline the lower equipment too far off vertical, for such inclination obscures the lower scanner's perception of either the leading or the trailing edge of the board being scanned. An opening in the chain race 46 carrying lumber 32 permits the lower scanning assembly 44 to view the bottom of boards 32

Camera Operation

Figure 5:
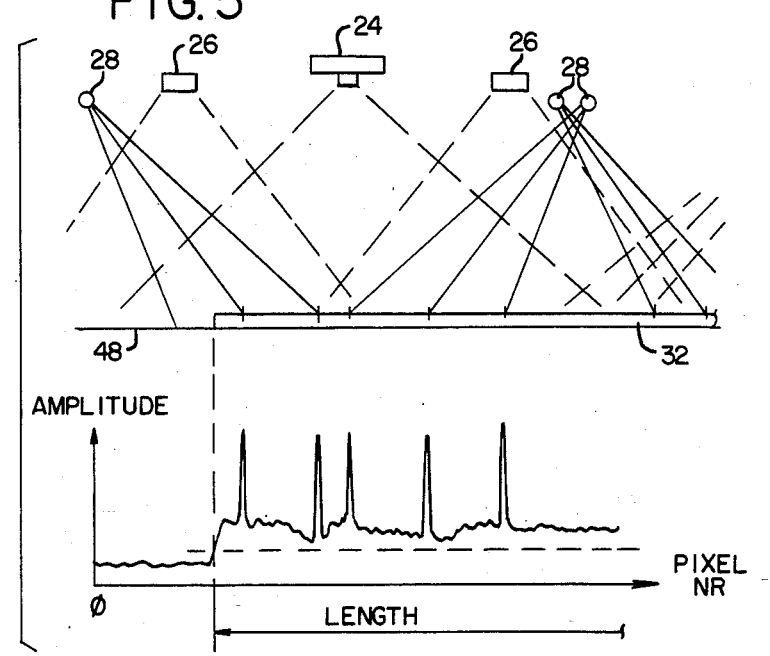
FIG. 5 is a diagram illustrating the relationship between the illumination of the object being scanned and the corresponding photodetector output signal.

Each camera 24 produces a single output signal having a plurality of voltage values corresponding to the intensity of light reflected from the object at a plurality of positions along a line on its surface The graph positioned below FIG. 5 shows a camera's output signal as a function of pixel number. For clarity, the pixel scale has been sized to correspond to the field viewed by the illustrated camera.

From FIG. 5 it can be seen that the camera output signal includes several sharp voltage spikes at the points where laser light intersects the lumber. At points intermediate these spikes, the halogen light reflected from the lumber has a relatively lower magnitude. At the end of the lumber the signal amplitude falls off towards zero. Little light is reflected from off the end of board since there is nothing nearby from which light can be reflected.

The scan data contained in the camera output signal can be analyzed to yield the configuration of the lumber in two dimensions. One dimension, the length of the board, can be ascertained by noting the location in the camera output signal at which the signal drops below a predetermined threshold. This establishes the position of an end of the board. A second dimension, the thickness of the board relative to a reference surface 48 on which the board is supported (here the top surface of the chain conveyor), can be determined from the position of the laser spikes in the camera output signal by using conventional triangulation techniques. For example, referring to the left-most laser spike in the camera output signals of FIG. 5, if the thickness of board 32 is increased, the position at which the laser beam intersects the board will move to the left. Thus, the spike would move to an earlier position in the camera output signal. By detecting the position of these spikes in the photodetector output signal, the thickness of the lumber relative to reference plane 48 can be determined.

Figure 8:
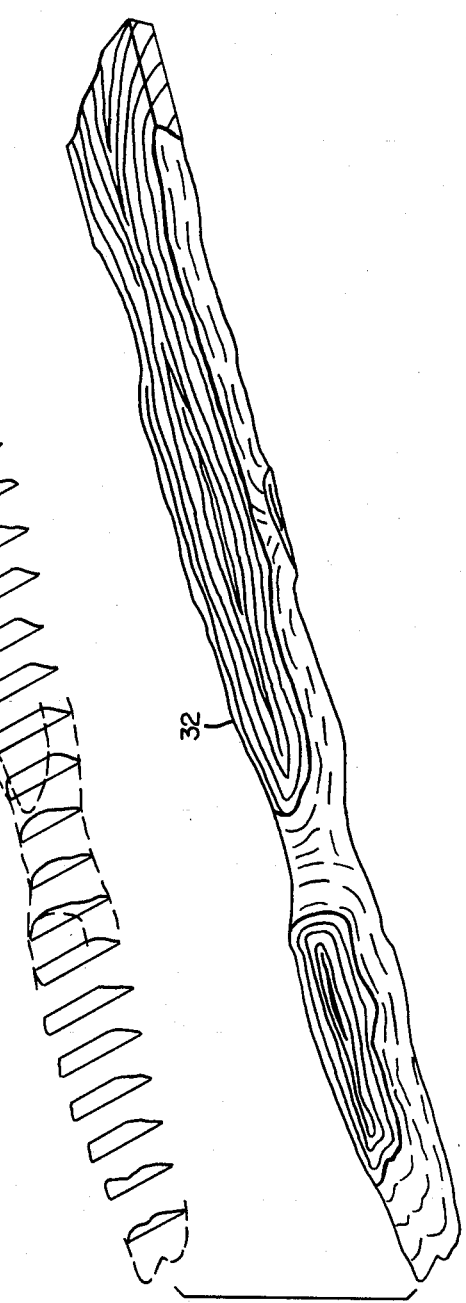
FIG. 8 is a diagram showing an unfinished piece of lumber and the computer model generated therefrom.

In the illustrated embodiment, a thickness profile is taken at every cross section illuminated by laser light (see FIG. 8). The number of such profiles is determined by the number of lasers and the characteristics of the beam splitters employed. In a typical installation, forty-eight profiles are produced, spaced approximately every five inches along the length of the board. Care must be taken, however, that adjacent laser images not be positioned so closely on the board that one might be mistaken for the other within the photodetector's field of view. That is, the expected ranges of travels of adjacent laser images must not overlap.

Adjacent cameras 24 are desirably spaced so that their fields of view overlap somewhat when projected onto the reference plane. When scanning thick boards, this region of overlap diminishes until, with boards of a certain thickness, the region of overlap disappears entirely. This point defines the upper limit of board thickness that can effectively be scanned with a particular component configuration. If boards thicker than this limit are scanned, certain areas on the board will not be imaged, resulting in undesirable blind spots. If a laser is directed onto a board within a region of overlap between the fields of view of two adjacent cameras, the system ignores one of the double images in its subsequent processing of this data.

The chain race supporting the boards prevents the imaging of certain regions on their undersides. However, these blind spots are not a problem since no board length measurements are derived from the lower scanner assembly and since no lasers are oriented into these regions.

Figure 4:
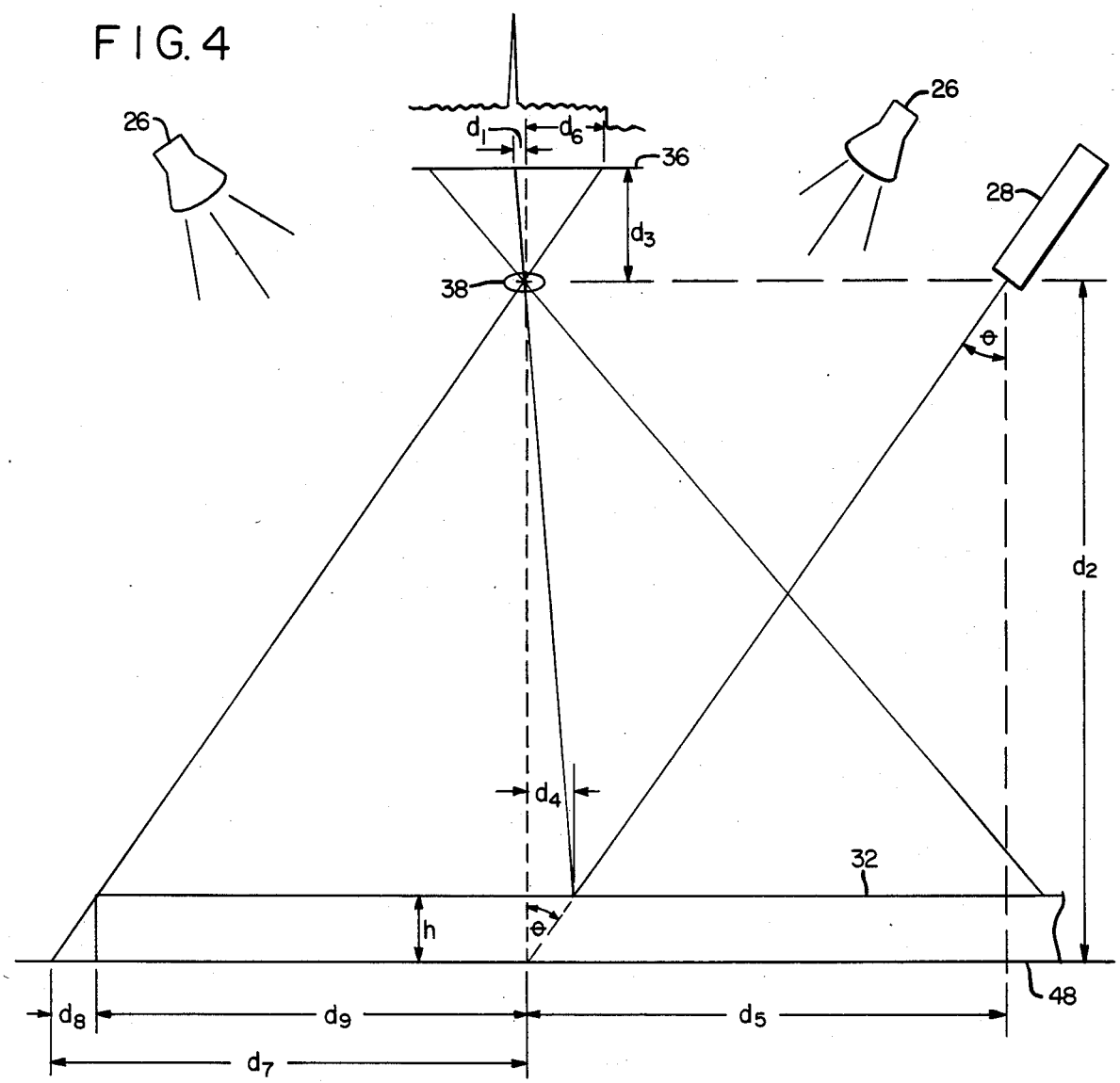
FIG. 4 is a diagram illustrating the geometrical relationships employed by the present invention.

FIG. 4 shows a representative scanner geometry that has been simplified somewhat for purposes of illustrating the mathematical relationships here involved. In particular, two simplifications have been made. The first is to position the output of laser 28 at the same horizontal plane as the lens 38 of camera 24. This equates the distance between the laser output and reference plane 48 with the distance between the lens and the reference plane, equating these variables in the following mathematical derivation. The other simplification involves the orientation of the laser so that it intersects reference plane 48, if no lumber is present, at a point directly below photodetector lens 38. This forces the relevant geometry to form right triangles which can be analyzed simply with basic geometrical relationships. It will be recognized, however, that laser 28 can be oriented in other directions and the analysis complicated only slightly and solved by resort to the law of cosines and the like.

The 1024 individual photodiodes on photodetector 36 are uniformly spaced along a linear substrate. This uniform spacing causes a different angle to be subtended between adjacent photodiodes when projected through lens 38. However, these unequal angles, when projected, produce again an array of equally spaced points on the reference plane and on any intervening horizontal plane.

Thickness

As noted earlier, the thickness of board 32 can be determined from the position at which a laser beam intersects the board. This position is indicated by distance $d_4$ in FIG. 4. It will be recognized that distance $d_4$ is related to the distance $d_1$ on photodetector diode array 36 by the ratio of the distances from lens 38 to reference plane 48 and to the photodetector, respectively. Thus, a principal relationship of the triangulation geometry is that $d_4$ approximately equals $$d_1 \times \frac{d_2}{d_3}$$

The product set forth above is actually equal to the projection of $d_1$ down onto the reference plane. Distance $d_4$ is slightly less than this product since the surface of the board is spaced away from the reference plane towards lens 38.

The thickness h of the board 32 is equal to the distance $d_4$ divided by the tangent of angle $\theta$. Angle $\theta$ is the angle by which laser 28 is inclined away from vertical. Since distance $d_4$ is known by the foregoing relationship, the thickness h of the lumber can be approximated as follows:

$$h = \frac{d_1 d_2^2}{d_3 d_5}$$

In the preferred embodiment, this equation is not computed for each of the nearly 26,000 thickness data points taken on each surface of a wide board. Rather, as discussed further below, a look-up table is compiled and the locations of the laser spikes within the camera output signal are correlated to the corresponding board thicknesses.

Since the mathematical characterization of the board thickness detailed above includes some approximations, the system is usually calibrated by boards of known dimensions to remove these ambiguities. For example, the position of laser images on a reference board two inches thick are noted and stored in the system. Similarly, reference values for other standard board thicknesses, including zero inches, can be recorded. These calibration data are then used as references within which the scan data can be interpolated.

Figure 7:
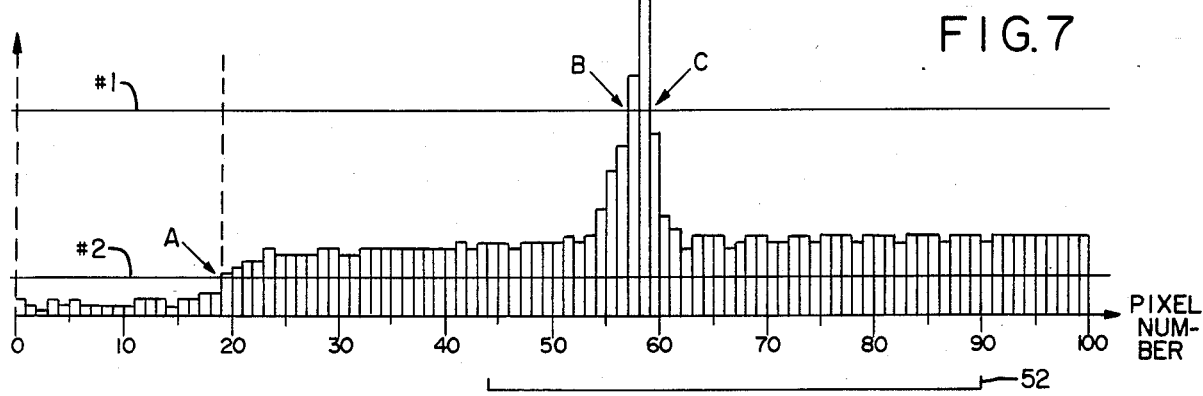
FIG. 7 is an enlarged view of a portion of the graph of FIG. 6 showing the region between pixels 0 and 100 in greater detail.
Figure 6:
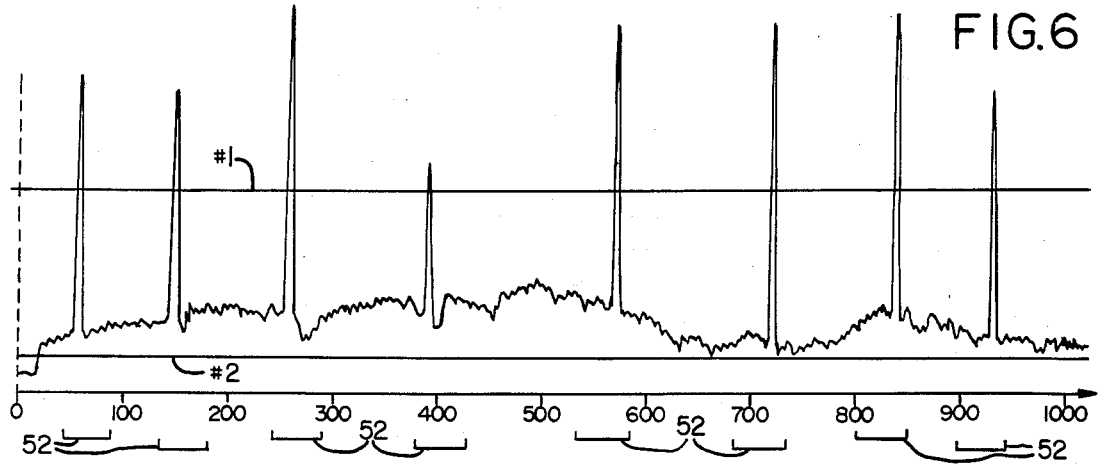
FIG. 6 is a graph illustrating the photodetector output signal versus pixel number for a representative scan.

FIGS. 6 and 7 include beneath the pixel axes the projected travel ranges 52 of the laser images. One end of each of these ranges (the right end of the range illustrated in FIG. 7) corresponds to the position of a laser image on a board of zero thickness. The opposite end of this range corresponds to the laser position on a board of the maximum anticipated thickness, here two inches. By noting the laser image position within its projected travel range and correlating this position with the board's thickness in the look-up table, the determination of board thickness can be accelerated and a major processing burden can be removed from the system.

To improve the resolution of measured board thickness beyond the limit set by the discrete spacing of the pixels on the board, a software implemented histogram can be compiled using the thickness data at each cross-section.

Length

The length of a board is determined by measuring its extent within the camera's field of view. Most boards measured by the system, of course, extend across the fields of view of several cameras, so the length determination depends primarily on the extent of the board across the field of view of the camera viewing the end of the board. (The extent of the board across each other camera's field of view is a value fixed by the system's geometry.) The extent of the end portion of the board can be determined by computing the end position of the board relative to the projection of lens 38 onto reference plane 48, as illustrated by length $d_7$ in FIG. 4.

As was the case with distance $d_4$, distance $d_7$ can be determined by resort to analysis of similar triangles. That is, distance $d_7$ relates to distance $d_6$ as distance $d_2$ relates to distance $d_3$:

$$d_7 = d_6 \times \frac{d_2}{d_3}$$

It will be recognized that this $d_7$ is the length of the lumber as it appears from the camera. The camera, however, has no depth perception. Thus, it is unable to tell the magnitude of any error in its perception of the length of the lumber introduced by the lumber's thickness. As can be seen in FIG. 4, the lumber is somewhat shorter than indicated by apparent distance $d_7$.

The present invention allows the computed length of the lumber to be refined by removing the parallax error introduced by the non-zero thickness of the lumber. The error in the length determination is represented by distance $d_8$. Again, an analysis of similar triangles reveals that distance $d_8$ relates to distance $d_6$ as the height $h$ of the lumber relates to distance $d_3$:

$$d_8 = d_6 \times \frac{h}{d_3}$$

Substituting the approximation for height h derived earlier results in a formula for the actual length $d_9$ of the lumber as follows:

$$d_9 = \frac{d_6}{d_3} \times (d_2 - h)$$

Thus, the processing stages of the present invention can correct the apparent length of the lumber for optical error introduced by its vertical extension.

Camera Interface Circuit

Figure 11:
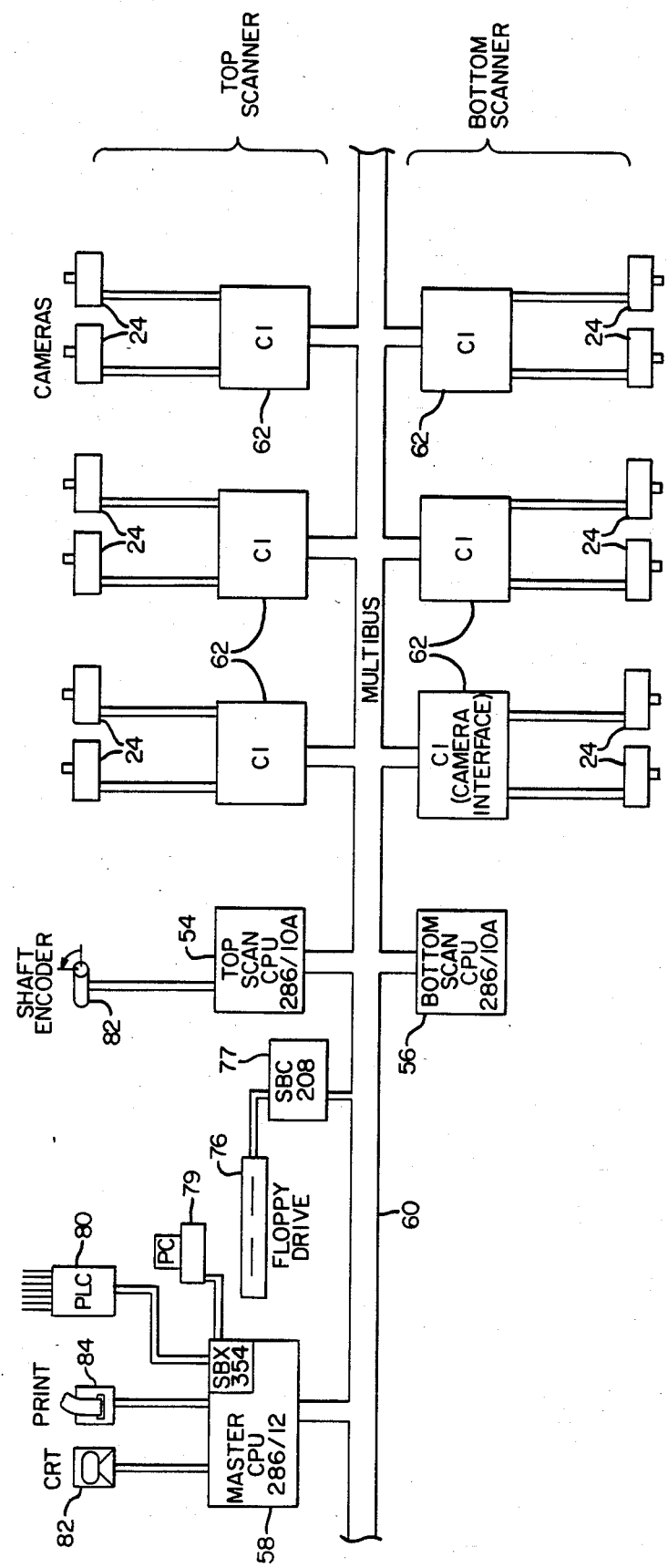
FIG. 11 is a block diagram showing the electrical integration of twelve cameras and their interconnection to a computer control system.

The cameras 24 of the present invention are linked, in pairs, to a system Multibus 60 which carries data to and from the system's microprocessors 54–58, as shown in FIG. 11. The linking of each pair of cameras to the Multibus 60 is effected by a camera interface circuit 62.

Figure 10:
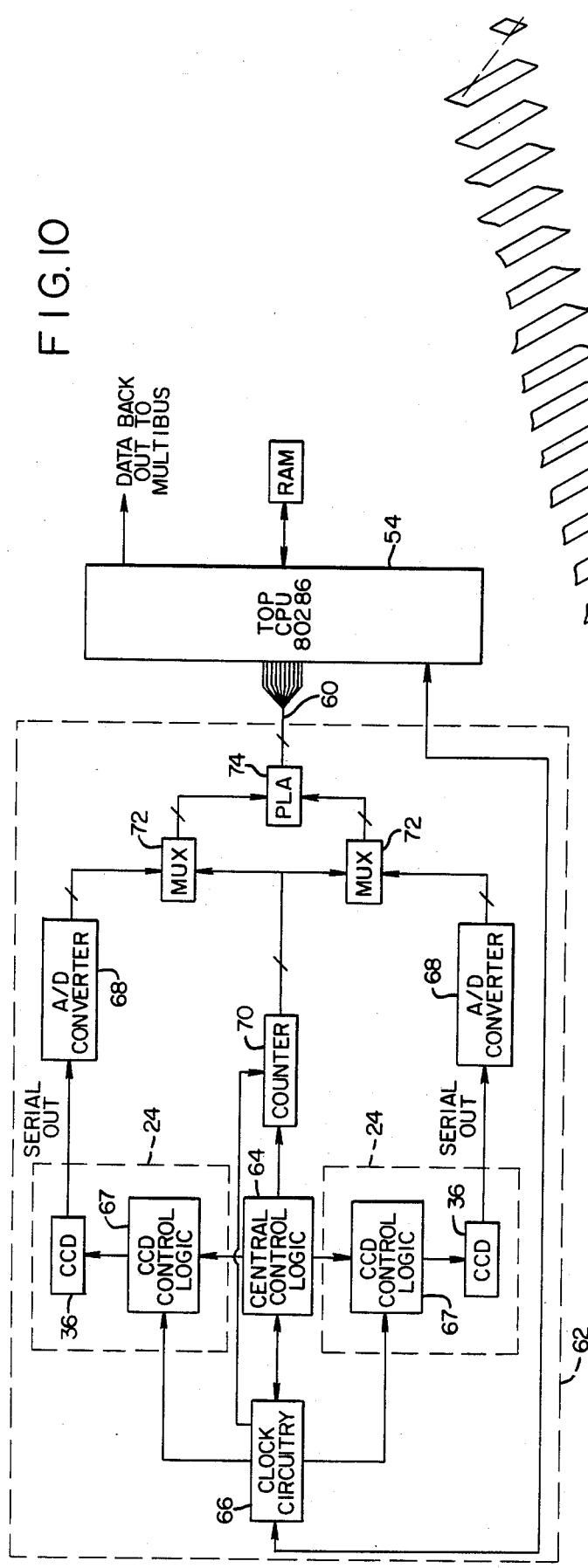
FIG. 10 is a schematic diagram of an illustrative camera interface circuit used for coupling two cameras to a system bus.

A schematic diagram of an illustrative camera interface circuit is shown in FIG. 10. Each camera 24 provides a serial output signal comprised of 1024 analog pixels, each of which has an analog amplitude related to the intensity of light reflected from a small region (0.050×0.050 inches) within its field of view. These 1024 analog pixels are clocked out of photodetectors 36 under the control of a central control logic circuit 64, a clock circuit 66 and a CCD control logic circuit 67. Each of the pixels is then converted into digital form by six bit A/D converters 68, thereby yielding a 64 level gray scale signal for every 0.050×0.050 inch region along the longitudinal scan line. The output of A/D converters 68 is interleaved with the output of a counter 70 in multiplexers 72. Counter 70 is a ten-bit binary counter that indicates which of the 1024 pixels from the photodetectors is being applied in digital form to the multiplexers. The outputs from multiplexers 72 are applied to a programmable logic array (PLA) 74. Thus, the signals applied to the PLA alternate, at a rate determined by clock 66, between a digitized version of one pixel of a photodetector output signal and the address of the photodetector element to which it corresponds.

Although not shown in FIG. 10 for clarity of presentation, multiplexers 72 and PLA 74 are also linked to clock circuit 66 and central control logic circuit 64. Similarly, although FIG. 10 shows an independent clock circuit 66, operation of camera interface circuit 62 is actually synchronized to the other interface circuits and to the CPUs by a signal on Multibus 60.

Data Reduction

The photodetectors of the present invention provide an enormous amount of raw data—more than is usually needed and more than expeditiously can be processed. (An eight-inch board yields 38,400 pixels of data per linear foot per side.) To reduce the data processing burden on the system, a data reduction function is implemented by programmable logic array 74 in camera interface circuit 62. One result of this data reduction is illustrated in FIG. 9 (not to scale).

Figure 9:
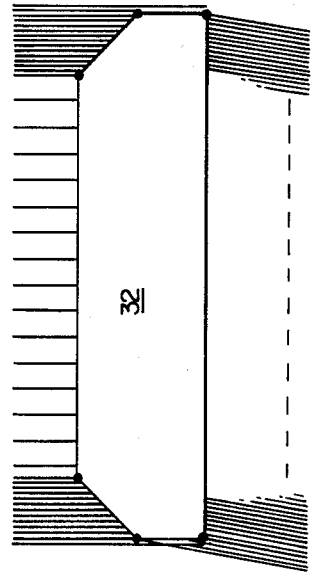
FIG. 9 is a diagram showing an end of an unfinished piece of lumber and the associated scan data related thereto after a data reduction operation.

Referring to FIG. 9, in processing an unfinished piece of lumber, the shape of its end is often a critical factor. When, for example, the wane extends to the end of the board, this irregular geometry must be accurately characterized if maximum yield is to be obtained. If the end of the board, or a portion thereof, is square, however, that shape can be adequately characterized by just a few data points. In order to reduce the system processing burden, the present invention does not determine board length for every longitudinal scan line as it would otherwise do. Instead, once the system detects a flat surface, much of the length (incandescent light) data is ignored and only every eighth scan line is processed to determine length (as represented by the widely spaced samples along the planar portion of the board end illustrated in FIG. 9). This one-eighth figure, of course, can be changed as needs dictate.

Feature Detection

As noted, the output from the A/D converters 68 yields a 64 level gray scale output signal for every 0.050×0.050 inch area along each longitudinal scan line. Since the scan lines are spaced every 0.050 inches along the width of the board, this gray scale data characterized the appearance of the entire surface of the board. This data can then in turn be used to sense defects, knots, grain patterns and other features of the board by CPUs 54-58.

Transition Detection

The camera output signal includes two types of transitions of interest. The first is a transition in intensity in reflected incandescent light that denotes the end of the board. The second is a transition in intensity in reflected laser light that distinguishes the laser light from the adjacent incandescent light. These transitions can be detected in a variety of ways.

A first technique for detecting these transitions is to establish one or more electrical reference signals against which the camera output signal can be compared. For example, FIGS. 6, 7 illustrate a reference signal #1 having a magnitude exceeding that of the photodetector output signal at all points except those spike portions corresponding to reflected laser light. By distinguishing those portions of the data signal having magnitudes greater than this reference signal from those portions having magnitudes less than the reference signal, the reflected laser light can be distinguished from the reflected incandescent light. The precise position of the reflected laser light within the photodetector output signal can be determined by averaging the positions at which the rising and falling edge of the laser signal pulse crosses the reference threshold.

The transition in reflected incandescent light indicating the end of the board (for example, transition A in FIG. 7) can be detected by establishing a second, lower reference signal, indicated by #2 in FIGS. 6, 7, and comparing the camera signal with this signal.

A second technique for detecting these two signal transitions is to sense differential changes in the camera output signal that exceed a certain value. Differential changes in signal magnitude exceeding 100 percent, for example, within the span of a few adjacent pixels are recognized to be one of the two transitions of interest. Referring again to FIG. 7, the first such transition in this figure is a positive transition of about 130 percent over a span of four adjacent pixels at point A. The second such transition is another positive transition, this one of more than 200 percent, over a span of four pixels at point B. The occurrence of one such large positive transition following another large positive transition indicates that the first transition denotes the end of the board and that the second denotes the rising edge of a laser pulse.

The next such large differential change in the photodetector output signal of FIG. 7 is a negative transition at point C corresponding to the falling edge of the laser pulse. (Again, the center of the laser pulse can be determined by averaging the position at which the two transitions bounding the pulse are detected). If two large negative transitions are detected consecutively, the first is deduced to correspond to the falling edge of a laser pulse and the second to the end of the board. By this differential detection technique, the relevant transitions can all be detected by the same mathematical processing steps, with their relevances being deduced from their sequence.

It should be noted that the camera output signal may sometimes drop briefly to a low magnitude when the photodetector images a dark feature on the face of the board, such as a knot or saddle wane. The system is desirably arranged to detect and filter such data so that it does not interfere with determination of the board's length and thickness.

Certain of the processing steps described above can be implemented in distributed fashion by the PLAs 74 in the six camera interface circuits 62. In the illustrated embodiment, the transition detection functions reviewed earlier are implemented in this manner. Each camera interface circuit 62 thus provides to Multibus 60 a reduced set of data indicating only the locations of the rising and falling laser transitions and any end transitions within the two camera output signals handled by that interface circuit.

Processing of the reduced scan data provided by camera interface circuits 62 is accomplished by top and bottom scanner CPUs 54 and 56. These CPUs are actually single board 80286 computers with 128K of RAM each that merge the data from the individual interface circuits into a single data set representing the entire board and perform the table look-up functions and the geometrical calculations reviewed earlier for each longitudinal scan line. A high-resolution shaft encoder 82 monitors the progress of chain conveyor 30 through the scanning zone and provides information on relative board positions to CPUs 54 and 56 for use in their processing.

CPUs 54 and 56 provide data to a master CPU 58 that characterizes the locations and shapes of the ends of the board, together with the shapes of its cross sections, as shown in FIG. 8. Master CPU 58 is a single board 80286 computer with one megabyte of RAM that runs an optimizing program to decide the optimum solutions for a board of the specified configuration to yield maximum product values. Master CPU 58 also includes report generation features and drives a user interface including a personal computer 79, a CRT 82 and printer 84. A programmable logic controller 80 is also driven by the master CPU and translates its instructions into commands that are sent to the lumber processing machinery being controlled—trimmers, edgers, etc. A control panel 78 (FIG. 1) provides direct user interface to programmable logic controller 80. A floppy disk drive 76 is used to load the relevant software instructions into top and bottom scanner CPUs 54, 56 and master CPU 58 through a single board computer interface 77.

By the scanning arrangement here employed, the system is able to perceive characteristics that often go undetected in other systems—characteristics such as saddle wane, steep wane, square board, shallow wane, roundtop/slab, feathered edges and non-square ends. The present system can measure virtually any angle of wane, from flat to nearly vertical. Because of the exceptionally large number of thickness profiles produced, the system can detect nearly all geometric defects.

Having described my invention with reference to an exemplary embodiment and several variations thereof, it should be apparent to those skilled in the art that the invention can be modified in arrangement and detail without departing from its basic principles.

Accordingly, I claim as my invention all modifications coming within the scope and spirit of the following claims and equivalents thereof: I claim:

1. In a method of scanning an elongated three-dimensional object using a photodetector to detect the position at which a beam of laser light intersects the elongated object and determining by triangulation therefrom a first dimension of the object, said first dimension being defined by the distance between a reference location and the point at which the beam of laser light intersects the object, an improvement useful for permitting the determination of a second dimension of the object including the steps:

illuminating a surface of the object with non-coherent light while the object is also being illuminated with laser light;

detecting with the photodetector the intensity of both the non-coherent and laser light reflected from the object at several positions along a line passing along said surface; and producing a single electrical data signal having a plurality of magnitudes corresponding to the intensity of light reflected from the object at a plurality of positions along the line.

2. The method of claim 1 which further comprises distinguishing portions of said data signal relating to the intensity of reflected laser light from portions of said data signal relating to the intensity of reflected non-coherent light.

3. The method of claim 2 in which the distinguishing step includes:

establishing an electrical reference signal;

comparing the data signal to the reference signal; and distinguishing those portions of the data signal having magnitudes greater than the reference signal from those portions of the data signal having magnitudes less than the reference signal.

4. The method of claim 2 in which the distinguishing step includes sensing a differential change in said data signal larger than a threshold value.

5. The method of claim 1 which further includes detecting a transition in the amount of non-coherent light reflected from adjacent positions along said line.

6. The method of claim 5 in which the detecting step includes comparing the data signal to a reference signal to detect thereby a transition in the amount of reflected light to a level above or below a threshold value corresponding to the reference signal.

7. The method of claim 5 in which the detecting steps includes sensing a differential change in said data signal larger than a threshold value.

8. The method of claim 7 in which the detection of the position at which the beam of laser light intersects the elongated object also comprises the step of sensing a differential change in said data signal larger than a threshold value.

9. The method of claim 5 which further comprises the step of correlating the detection of said transition to the location of an apparent edge of the elongated object.

10. The method of claim 9 which further comprises the step of compensating the correlated location of the apparent edge of the elongated object for optical error caused by the extension of the object in the first dimension.

11. The method of claim 1 which further comprises the step of correlating the amount of light reflected from the object to the position of features visible on the surface of the object.

12. The method of claim 1 which additionally comprises the steps:

moving the object transversely of said line; and repeating the three steps of the method of claim 1 as the object moves so as to permit the characterization of the shape of the object in a third dimension.

13. The method of claim 5 which additionally comprises the steps:

illuminating with non-coherent light a second surface of the object not coextensive with the first surface;

detecting with a second photodetector the intensity of light reflected from the object at several positions along a line on its second surface; and detecting a transition in the amount of light reflected from adjacent positions along said line, whereby a location of an edge of the object along the second line on the second surface can be determined.

14. An apparatus useful for characterizing the configuration of a three-dimensional object comprising:

support means for supporting the object;

first light means for illuminating a plurality of positions on a surface of the object with light of a first intensity;

second light means for illuminating at least one region on a surface of the object with light of a second, different intensity while said object is also being illuminated by the first light means; and photodetector means, positioned to view at least portions of the surfaces illuminated by the first and second light means, for producing a single output signal having a plurality of values corresponding to the intensity of light reflected by the object from both the first and second light means at a plurality of positions within the field of view of the photodetector means.

15. The apparatus of claim 14 which further comprises processing means coupled to the photodetector means, the processing means including first detection means for detecting transitions in the photodetector output signal caused by changes in the intensity of light reflected from the first light means at adjacent positions within the field of view of the photodetector means and for producing a signal corresponding thereto, second detection means for detecting values in the photodetector output signal that relate to the light reflected by the object from the second light means and for producing a signal corresponding thereto, and means operative upon said signals for producing data related to the configuration of the object in two dimensions.

16. The apparatus of claim 15 in which the means operative upon said signals produces data related to the configuration of the object in the following two dimensions:

the first dimension being a distance between a reference location and a region on the surface of the object illuminated by the second light means; and the second dimension being substantially orthoganal to the first and comprising the extension of the object across the field of view of the photodetector means.

17. The invention of claim 16 in which the processing means further includes means for correcting the data related to the configuration of the object in the second dimension to compensate for optical error introduced by the extension of the object in the first dimension.

18. The apparatus of claim 14 in which the support means includes means for moving the object so that different regions thereof are illuminated by the second light means.

19. The apparatus of claim 15 which further comprises third light means for illuminating at least one region on a surface of the object that is not coextensive with the surface of the object illuminated by the second light means;
second photodetector means, positioned to view at least a portion of the surface illuminated by the third light means, for producing an output signal having a plurality of values corresponding to the intensity of light reflected by the object from the third light means at a plurality of positions within the field of view of the second photodetector means; and
processing means coupled to the second photodetector means for producing from the second photodetector output signal data related to the configuration of the object in a third dimension defined by the distance between the last named surface of the object and a reference location.

20. The apparatus of claim 15 which further comprises a plurality of photodetector means and in which the processing means includes means for combining the output signals provided by the plurality of photodetector means, whereby the configuration of an object that is larger than can fit within the field of view of a single photodetector means may be characterized.

21. The invention of claim 15 in which at least one of said first or second detection means includes means for sensing differential change in the photodetector output signal and indicating if said differential change exceeds a predetermined value.

22. The invention of claim 15 in which at least one of said detection means includes means for comparing the values of the photodetector output signal with a reference signal and indicating which of the former are greater than the latter.

23. The invention of claim 15 in which the first detection means and the second detection means comprise the same means.

24. An apparatus useful in characterizing the configuration of an elongated board comprising:
support means for supporting the board;
light means for illuminating the surface of the board;
photodetector means for producing an electrical output signal having a plurality of values corresponding to the intensity of light reflected from a plurality of positions along a line on the surface of the board;
processing means coupled to the photodetector means for detecting a transition in the photodetector output signal corresponding to a transition in the amount of light reflected from adjacent positions along said line and for determining from the position of said detected transition in the photodetector output signal the location of an apparent edge of the board;
means for providing to the processing means data related to a distance between said surface of the board and a reference location; and
means for compensating said determined location of the apparent edge of the board for optical error introduced by said distance between the surface of the board and the reference location.

25. In a method of optically scanning an board, an improvement comprising the steps:
illuminating the board with lights of two different intensities simultaneously; and
sensing with a linear photodetector the light reflected from the board and producing therefrom a single photodetector output signal containing information about the extent of the board in two substantially orthogonal dimensions.

* * * * *